US012753569B2

(12) United States Patent
Shirato et al.

(10) Patent No.: US 12,753,569 B2
(45) Date of Patent: Oct. 6, 2026

(54) CONSTRUCTION MACHINE

(71) Applicant: HITACHI CONSTRUCTION MACHINERY CO., LTD., Tokyo (JP)

(72) Inventors: Shuu Shirato, Tsuchiura (JP); Masahiro Kayane, Tsuchiura (JP); Kento Kumagai, Ami-machi (JP); Mitsuhiko Kanehama, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/994,883

(22) PCT Filed: Mar. 29, 2023

(86) PCT No.: PCT/JP2023/013027
§ 371 (c)(1),
(2) Date: Jan. 15, 2025

(87) PCT Pub. No.: WO2024/201853
PCT Pub. Date: Oct. 3, 2024

(65) Prior Publication Data

US 2026/0022533 A1 Jan. 22, 2026

(51) Int. Cl.
*E02F 3/42* (2006.01)
*E02F 3/32* (2006.01)
(Continued)

(52) U.S. Cl.
CPC ................ *E02F 3/435* (2013.01); *E02F 3/32* (2013.01); *E02F 3/425* (2013.01); *E02F 9/2203* (2013.01);
(Continued)

(58) Field of Classification Search
CPC ......... E02F 9/262; E02F 9/2221; E02F 3/425; E02F 9/2203
See application file for complete search history.

(56) References Cited

U.S. PATENT DOCUMENTS

2012/0303227 A1 11/2012 Nakamura
2014/0283509 A1* 9/2014 Hijikata .................. F15B 21/14 60/459
(Continued)

FOREIGN PATENT DOCUMENTS

JP 2007-100779 A 4/2007
JP 2011-174312 A 9/2011
(Continued)

OTHER PUBLICATIONS

International Preliminary Report on Patentability received in corresponding International Application No. PCT/JP2023/013027 dated Oct. 9, 2025.
(Continued)

*Primary Examiner* — Abiy Teka
(74) *Attorney, Agent, or Firm* — MATTINGLY & MALUR, PC

(57) ABSTRACT

There is provided a construction machine including first and second hydraulic actuators that are driven by first and second hydraulic pumps, respectively, and drive a front work implement, a third hydraulic actuator driven by the second hydraulic pump, solenoid valves that control a hydraulic fluid supplied to the second hydraulic actuator, an operation device that operates the front work implement, and a controller that controls the solenoid valves and the first and second hydraulic pumps on the basis of the distance between the front work implement and a target construction face and an operation signal. The controller computes an upper limit speed of the second hydraulic actuator on the basis of the flow rate difference between the maximum
(Continued)

delivery rate of the second hydraulic pump and a supply flow rate supplied to the third hydraulic actuator, computes a target speed of the second hydraulic actuator while limiting, by the upper limit speed, a required speed of the second hydraulic actuator according to the operation signal, and controls the solenoid valves and the second hydraulic pump according to the target speed.

4 Claims, 10 Drawing Sheets

(51) Int. Cl.

| | |
|---|---|
| ***E02F 3/43*** | (2006.01) |
| ***E02F 9/22*** | (2006.01) |
| ***E02F 9/26*** | (2006.01) |
| ***F15B 11/17*** | (2006.01) |
| ***F15B 13/06*** | (2006.01) |
| ***F15B 19/00*** | (2006.01) |
| *E02F 9/20* | (2006.01) |

(52) U.S. Cl.

CPC .......... *E02F 9/2285* (2013.01); *E02F 9/2292* (2013.01); *E02F 9/262* (2013.01); *F15B 11/17* (2013.01); *F15B 13/06* (2013.01); *F15B 19/00* (2013.01); *E02F 9/2004* (2013.01); *E02F 9/2296* (2013.01); *F15B 2211/329* (2013.01)

(56) References Cited

U.S. PATENT DOCUMENTS

| | | | | |
|---|---|---|---|---|
| 2016/0025113 | A1 * | 1/2016 | Hiraku .................... | F15B 13/06 60/428 |
| 2018/0251960 | A1 * | 9/2018 | Takahashi ............... | F15B 20/00 |
| 2020/0370279 | A1 | 11/2020 | Kozui | |
| 2022/0098825 | A1 | 3/2022 | Yoshihara et al. | |
| 2023/0358022 | A1 * | 11/2023 | Kumagai ............ | F15B 11/0423 |

FOREIGN PATENT DOCUMENTS

| | | | |
|---|---|---|---|
| JP | 2018-145985 | A | 9/2018 |
| JP | 2019-138114 | A | 8/2019 |
| WO | 2014168058 | A1 | 10/2014 |
| WO | 2020162146 | A1 | 8/2020 |

OTHER PUBLICATIONS

International Search Report of PCT/JP2023/013027 dated Jun. 20, 2023.

* cited by examiner

[FIG.1]
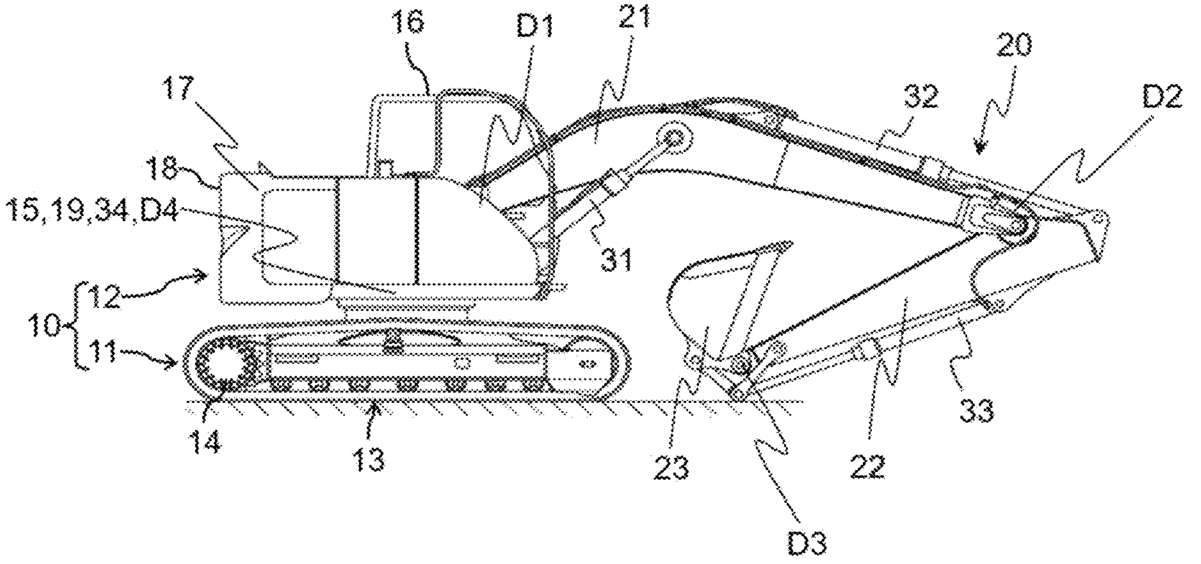

[FIG. 2]
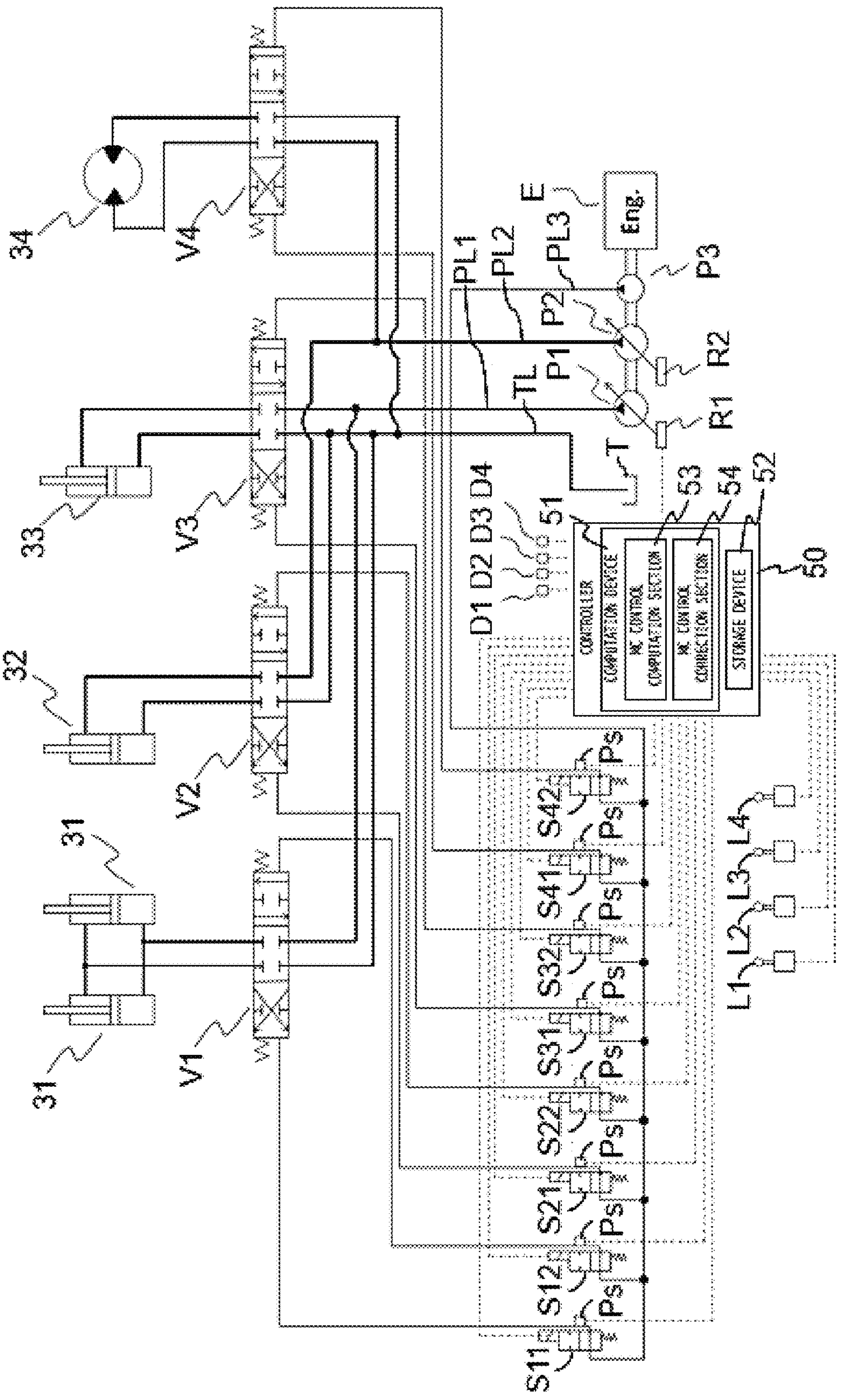

[FIG.3]
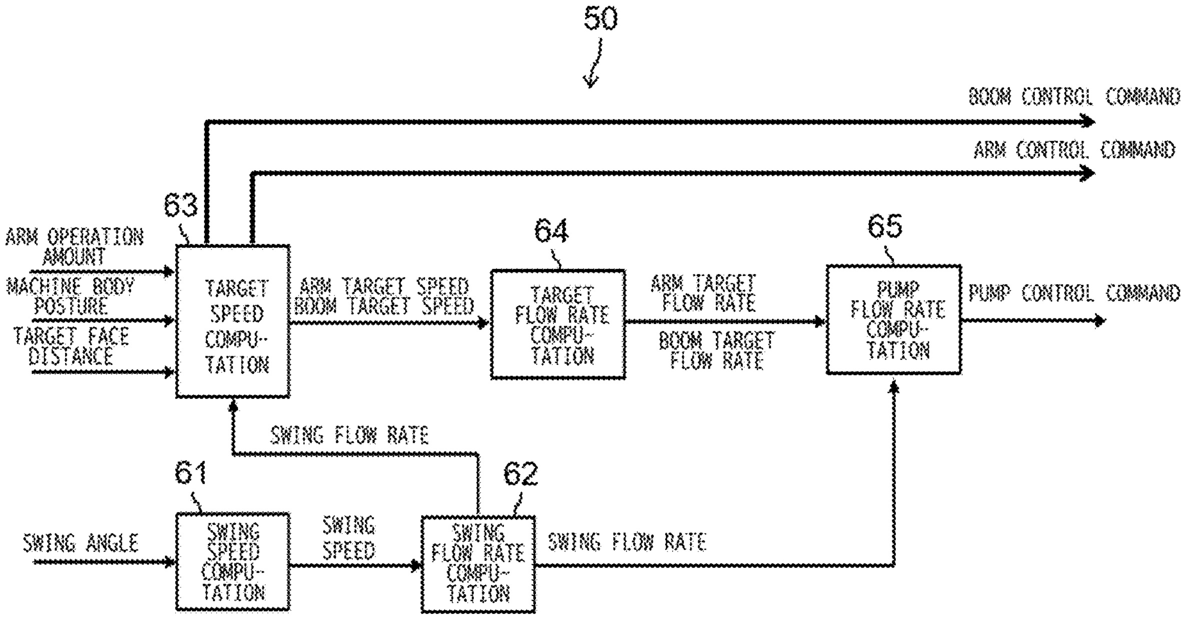

[FIG.4]
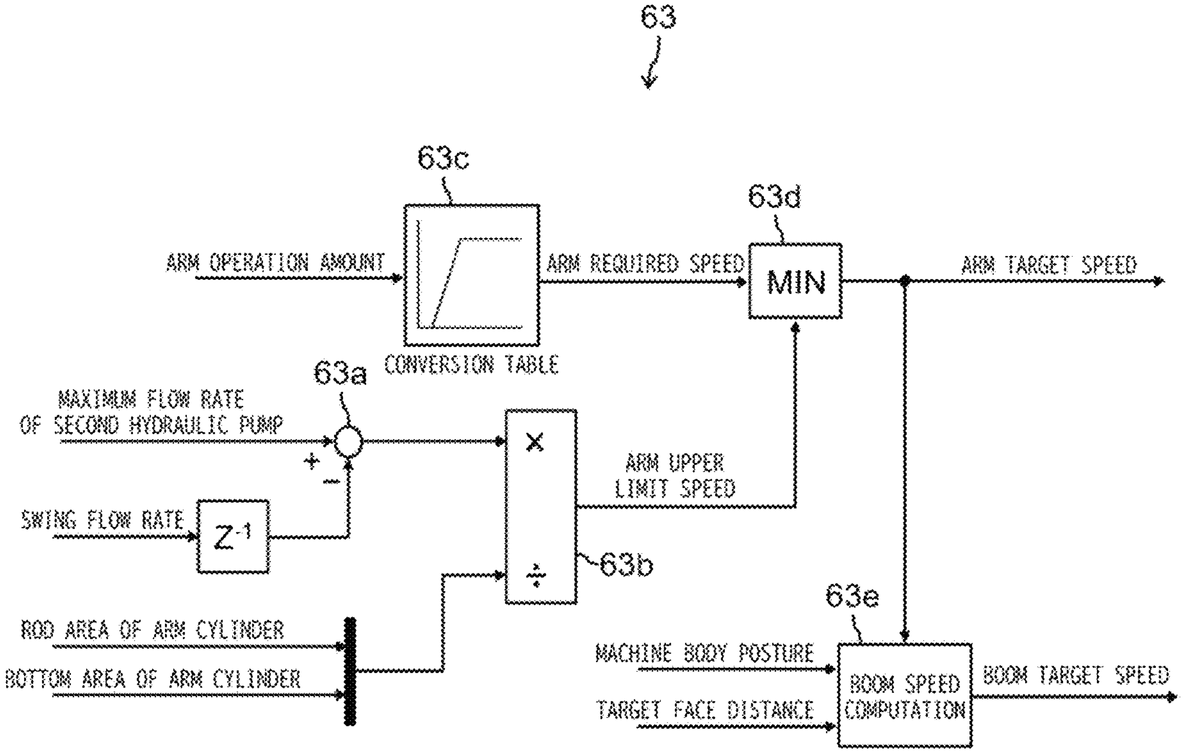

[FIG.5]
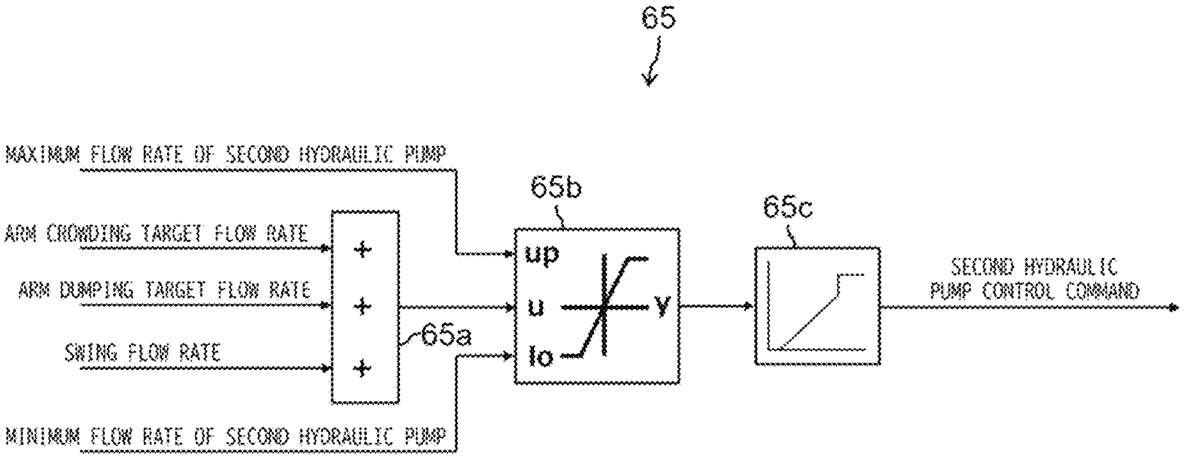

[FIG.6]
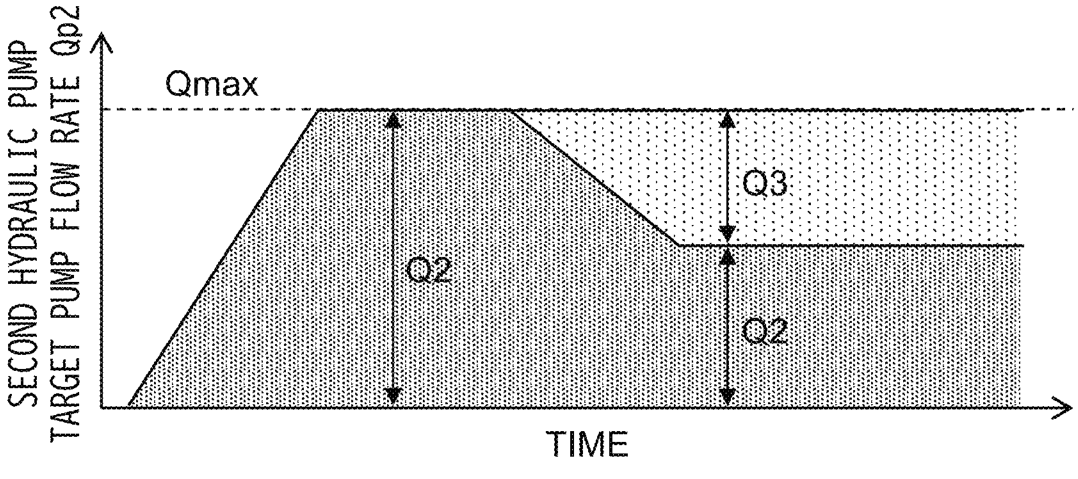

[FIG.7]
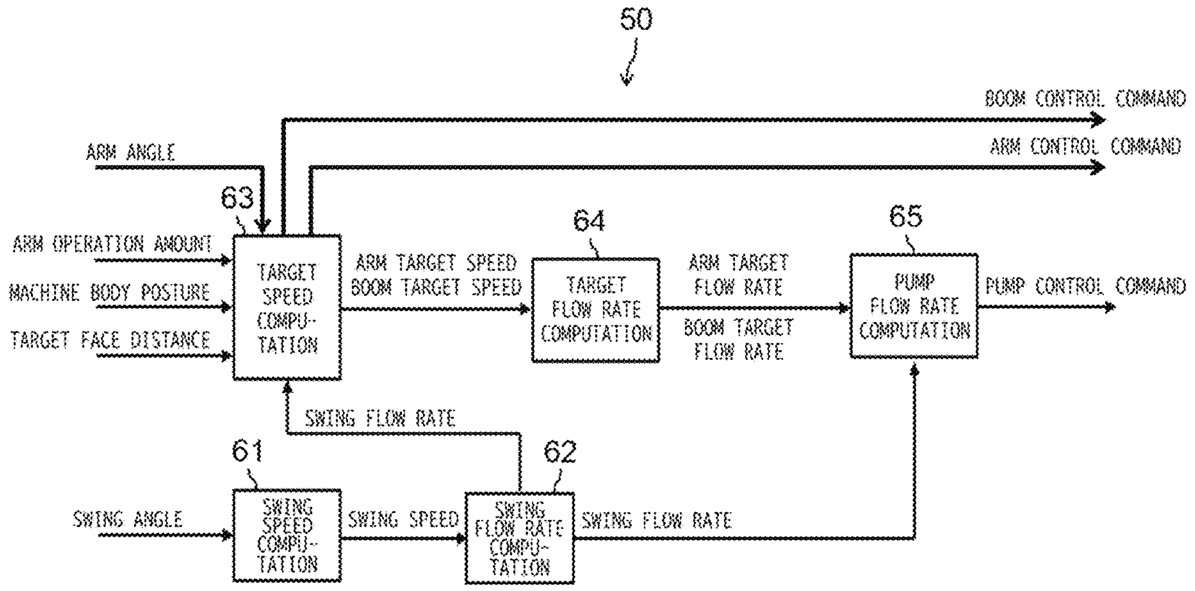

[FIG.8]
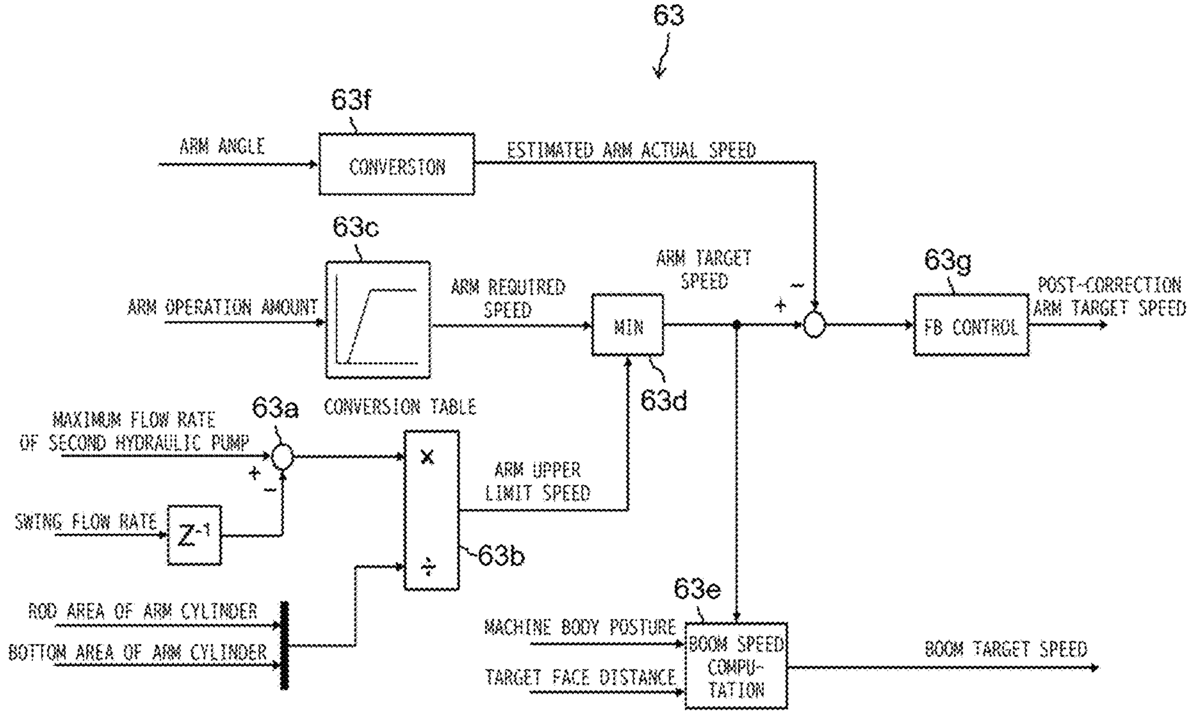

[FIG. 9]
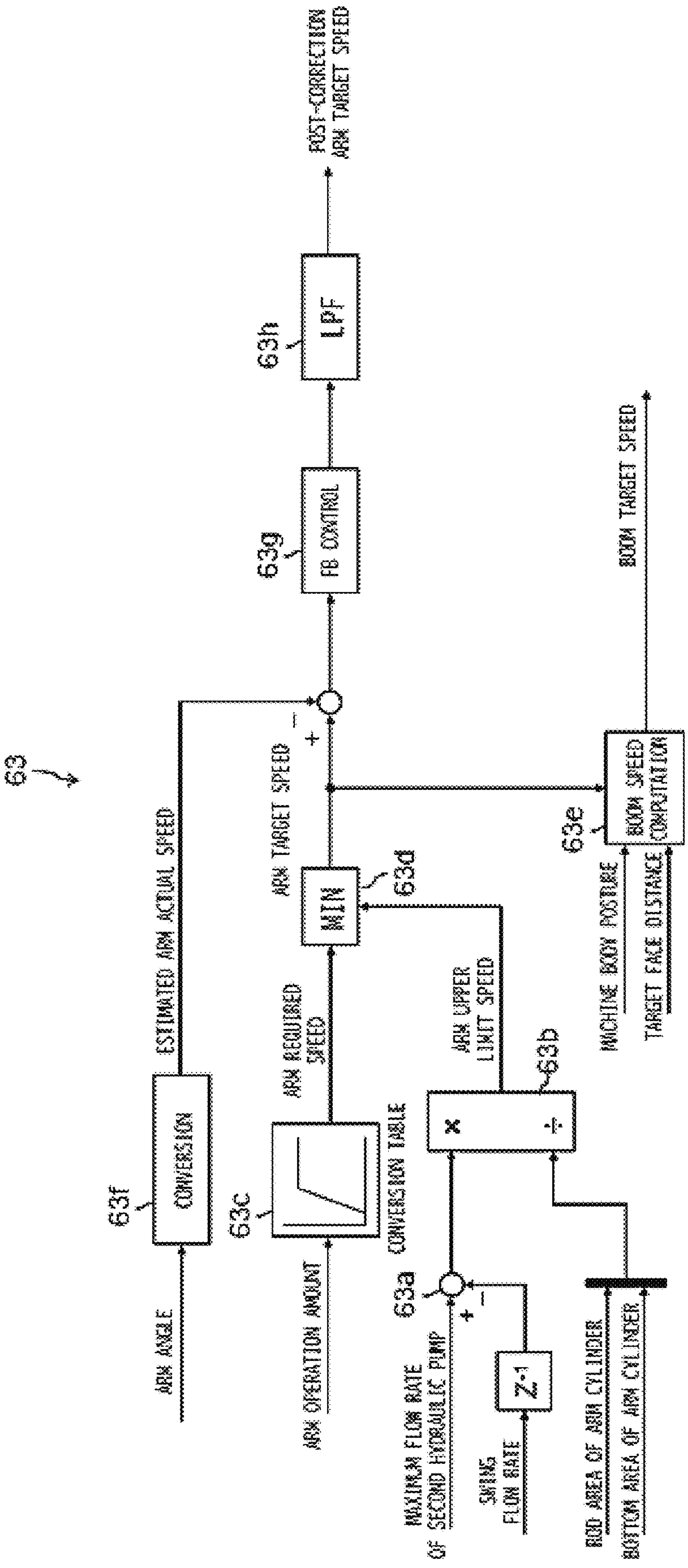

[FIG.10]
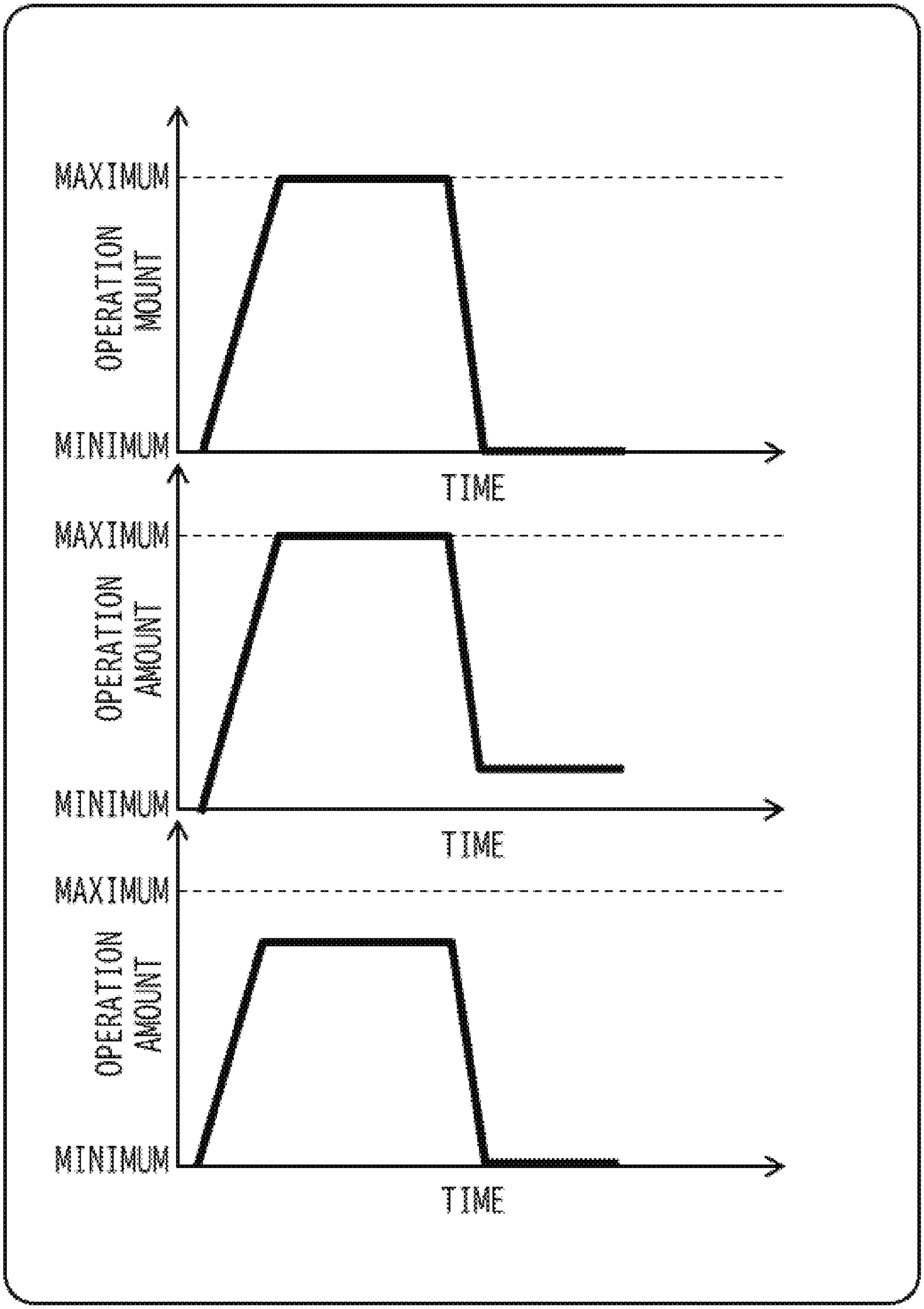

CONSTRUCTION MACHINE

TECHNICAL FIELD

The present invention relates to a construction machine such as a hydraulic excavator.

BACKGROUND ART

In recent years, an observational construction control system has been being introduced at construction sites due to utilization of ICT, and construction machines having a function of machine control (hereinafter, abbreviated as MC) to execute automatic control or semi-automatic control of a front work implement depending on the designed terrain profile (target construction face) of a construction site have been becoming popular. In the specification of the present application, the "automatic control" means control in which a controller drives a hydraulic actuator that is not being operated by an operator, and the "semi-automatic control" means control in which the controller corrects action of a hydraulic actuator that is being operated by the operator with intervention in the operation by the operator.

Incidentally, at a construction site, even during work using the MC function, an operator operates a hydraulic actuator other than the hydraulic actuator that is the target of the MC, in some cases. For example, during driving of a front work implement with use of the MC function, an operator operates an attachment such as a positioning cylinder or a tilt rotator or executes swing operation of a swing structure in the case in which it is impossible to cause the machine body to directly face a construction face due to the work environment, or the case in which the work range is widened to suppress the number of times of movement of the machine body, or the like.

In the MC control, there is a case in which a target flow rate for driving a hydraulic actuator at a target speed of the hydraulic actuator according to operation by an operator or the like is computed and the delivery rate of a hydraulic pump and the pilot pressure of a control valve are controlled. During combined operation of a plurality of hydraulic actuators, the delivery rate of the hydraulic pump is decided depending on the target speed and the target flow rate of each hydraulic actuator. However, the maximum flow rate at which the hydraulic pump can execute delivery is determined depending on the specifications of the hydraulic pump. Thus, when the total target flow rate of the plurality of hydraulic actuators that are driven exceeds the maximum delivery rate of the hydraulic pump, each hydraulic actuator is not driven at the target speed in some cases. In this case, there is a possibility that the accuracy of the MC control lowers, and it is impossible to shape the construction site as designed or it is impossible to manually operate the machine body as intended by the operator.

As a technology to solve this problem, Patent Document 1 discloses a hydraulic control system in which, when the maximum delivery rate of a hydraulic pump is insufficient relative to the total target flow rate of a plurality of hydraulic actuators, a flow of a delivered fluid of another hydraulic pump is combined to compensate for the insufficiency.

PRIOR ART DOCUMENT

Patent Document

Patent Document 1: JP-2007-100779-A

SUMMARY OF THE INVENTION

Problem to Be Solved by the Invention

In general, there is a characteristic that, when a plurality of hydraulic actuators connected to the same hydraulic pump simultaneously act, the delivered fluid of the hydraulic pump readily flows into the hydraulic actuator with a low load pressure. Meanwhile, when the numbers of divided flows and combined flows on hydraulic lines that connect the hydraulic actuators to the hydraulic pump are smaller, the influence of the load pressure on control of the flow rate of supply to each hydraulic actuator can be suppressed to a larger extent. Due to this, in the MC control, it is desirable to set the numbers of hydraulic pumps and hydraulic actuators connected to the same hydraulic line to small numbers and suppress flow dividing and flow combining of the delivered fluid of the hydraulic pump.

In contrast, in the hydraulic control system described in Patent Document 1, when the maximum delivery rate of the hydraulic pump is insufficient relative to the target flow rate of the hydraulic actuator, the target flow rate of the hydraulic actuator is ensured by combining a flow of the delivered fluid of another hydraulic pump. However, with such a configuration, the part at which a flow of the delivered fluid of the hydraulic pump is divided and the part at which flows of the delivered fluid are combined increase, and the MC control becomes more susceptible to the influence of the load pressure of each hydraulic actuator. Further, there is a possibility that flow dividing during combined operation becomes complicated and the accuracy of the MC control lowers.

As one example of work using the MC control, there exists work referred to as excavation for foundation. The excavation for foundation is ground leveling work in which a boom and an arm are operated in association with each other to excavate a ground face in front of the machine body such that the height of the face resulting from the excavation becomes even. In this case, for example, when a boom cylinder is driven by a first hydraulic pump and an arm cylinder is driven by a second hydraulic pump, the hydraulic actuator and the hydraulic pump are in a one-to-one relationship. Thus, flow dividing and flow combining do not exist and the accuracy of the MC control is kept high. In this excavation for foundation, in some cases, operation for swing action is executed while the boom and the arm are being driven under the MC control with the intention to enlarge the ground leveling range without moving the machine body. In this case, with a circuit configuration in which a swing motor is driven by the second hydraulic pump, a flow of the delivered fluid of the second hydraulic pump is divided into the arm cylinder and the swing motor unlike the case in which the excavation for foundation is executed by only action of the boom and the arm. In this situation, when the total target flow rate of the arm cylinder and the swing motor exceeds the maximum delivery rate of the second hydraulic pump due to operation by the operator, the maximum delivery rate of the second hydraulic pump is insufficient relative to the target flow rate. In this example, with the technology described in Patent Document 1, each target flow rate of the arm cylinder and the swing motor can be ensured by combining a flow of the delivered fluid of the first hydraulic pump with a hydraulic line of the second hydraulic pump. However, combining flows of the delivered fluid of the first hydraulic pump and the second hydraulic pump in this manner makes the state in which a flow of not only the delivered fluid of the second hydraulic pump but also the delivered fluid of the first hydraulic pump is divided into the boom cylinder, the arm cylinder, and the swing motor. As a result, there is a possibility that the load pressure of the first hydraulic pump and the boom cylinder comes to affect the MC control relating to the excavation for foundation and the accuracy of the MC control lowers.

An object of the present invention is to provide a construction machine that can suppress the lowering of the accuracy of MC control while ensuring favorable responsiveness to operation intended by an operator even in the case in which a hydraulic actuator that is not a target of the MC control is operated during the MC control.

Means for Solving the Problem

In order to achieve the above-described object, the present invention provides a construction machine including a machine body, a front work implement attached to the machine body, a first hydraulic pump and a second hydraulic pump mounted in the machine body, a first hydraulic actuator that is driven by a delivered fluid of the first hydraulic pump and drives the front work implement, a second hydraulic actuator that is driven by a delivered fluid of the second hydraulic pump and drives the front work implement, a third hydraulic actuator driven by the delivered fluid of the second hydraulic pump, a directional control valve that controls a flow of a hydraulic fluid supplied from the second hydraulic pump to the second hydraulic actuator, solenoid valves that generate a pilot pressure that drives the directional control valve, an operation device for operating the front work implement, a sensor that senses a state amount corresponding to action of the third hydraulic actuator, and a controller that controls the solenoid valves, the first hydraulic pump, and the second hydraulic pump on the basis of a target face distance that is the distance between a specific point in the front work implement and a target construction face that is set in advance and an operation signal according to operation of the operation device. The controller is configured to compute a supply flow rate of the hydraulic fluid supplied from the second hydraulic pump to the third hydraulic actuator, on the basis of an output of the sensor, and compute an upper limit speed of the second hydraulic actuator on the basis of the flow rate difference between the maximum flow rate at which the second hydraulic pump is capable of delivering and the supply flow rate supplied to the third hydraulic actuator. Further, the controller is configured to compare a required speed of the second hydraulic actuator according to the operation signal with the upper limit speed and compute the required speed as a target speed of the second hydraulic actuator when the required speed is equal to or lower than the upper limit speed and compute the upper limit speed as the target speed when the required speed exceeds the upper limit speed. Furthermore, the controller is configured to add the supply flow rate supplied to the third hydraulic actuator to a flow rate according to the target speed of the second hydraulic actuator to compute a target flow rate of the second hydraulic pump and control the solenoid valves on the basis of the target speed and control the second hydraulic pump on the basis of the target flow rate.

Advantages of the Invention

According to the present invention, it is possible to provide a construction machine that can suppress the lowering of the accuracy of MC control while ensuring favorable responsiveness to manual operation intended by an operator even in the case in which a hydraulic actuator that is not a target of the MC control is manually operated during the MC control.

BRIEF DESCRIPTION OF THE DRAWINGS

FIG. 1 is a side view of a hydraulic excavator that is one example of a construction machine according to a first embodiment of the present invention.

FIG. 2 is a hydraulic circuit diagram of the major part of a hydraulic system mounted in the construction machine according to the first embodiment of the present invention.

FIG. 3 is a schematic diagram representing logic of MC control performed by a controller included in the construction machine according to the first embodiment of the present invention.

FIG. 4 is a functional block diagram representing details of processing of a target speed computation (FIG. 3) performed by the controller included in the construction machine according to the first embodiment of the present invention.

FIG. 5 is a functional block diagram representing details of processing of a pump flow rate computation (FIG. 3) performed by the controller included in the construction machine according to the first embodiment of the present invention.

FIG. 6 is a diagram representing an example of transition of a target flow rate of a second hydraulic pump and a target flow rate of an arm cylinder included therein in the case in which swing operation interrupts during MC control in the first embodiment of the present invention.

FIG. 7 is a schematic diagram representing logic of MC control performed by the controller included in a construction machine according to a second embodiment of the present invention.

FIG. 8 is a functional block diagram representing details of processing of a target speed computation (FIG. 7) performed by the controller included in the construction machine according to the second embodiment of the present invention.

FIG. 9 is a functional block diagram representing details of processing of a target speed computation performed by the controller included in a construction machine according to a third embodiment of the present invention.

FIG. 10 is a diagram representing examples in which the difference between a target speed and an estimated actual speed of a second hydraulic actuator rapidly becomes large in a short time.

MODES FOR CARRYING OUT THE INVENTION

Embodiments of the present invention are described below with use of the drawings.

First Embodiment

1. Construction Machine

FIG. 1 is a side view of a hydraulic excavator that is one example of a construction machine according to a first embodiment of the present invention. In the present embodiment, a hydraulic excavator in which a bucket 23 is mounted as an attachment at the tip of a front work implement 20 (work device) is described as an example of the construction machine. However, the present invention can be applied also to a hydraulic excavator in which an attachment other than the bucket is mounted or other kinds of construction machines such as a wheel loader and a bulldozer. In the specification of the present application, the front side of a cab 16 (right side in FIG. 1) is defined as the front side of the hydraulic excavator (to be exact, swing structure 12).

The hydraulic excavator depicted in this diagram includes a machine body 10 and the front work implement 20 attached to this machine body 10. The machine body 10 includes a track structure 11 and the swing structure 12.

The track structure 11 includes left and right track devices 13 of a crawler type having continuous track crawlers in the present embodiment, and travels by driving the left and right track devices 13 by use of left and right travelling motors 14, respectively. Hydraulic motors are used as the travelling motors 14.

The swing structure 12 is swingably disposed over the track structure 11 with the interposition of a swing device 15. A swing motor 34 is included in the swing device 15 that joins the track structure 11 to the swing structure 12. The swing motor 34 is driven and the swing structure 12 swings around a vertical center axis relative to the track structure 11. The swing motor 34 is a hydraulic actuator (hydraulic motor). The cab 16 in which an operator rides is disposed at a front portion (in the present embodiment, on the left side of the front portion) of the swing structure 12. A machine room 17 that houses hydraulic pumps P1 and P2 (FIG. 2) and the like is mounted on the rear side of the cab 16 in the swing structure 12. A counterweight 18 that maintains weight balance with the front work implement 20 is mounted at the rear end of the swing structure 12.

The front work implement 20 is an articulated work arm for executing work such as excavation of earth and sand, and is joined to a front portion of the swing structure 12 (in the present embodiment, on the right side of the cab 16). This front work implement 20 includes a boom 21, an arm 22, and the bucket 23. The boom 21 is joined to a swing frame 19 that is a base frame of the swing structure 12 by a pin, and pivots upward and downward relative to the swing structure 12 in association with extension and contraction of a boom cylinder 31. Both ends of the boom cylinder 31 are pivotally joined to the boom 21 and the swing structure 12. The arm 22 is joined to the tip of the boom 21 by a pin, and pivots forward and rearward relative to the boom 21 in association with extension and contraction of an arm cylinder 32. Both ends of the arm cylinder 32 are pivotally joined to the arm 22 and the boom 21. The bucket 23 is joined to the tip of the arm 22 by a pin, and pivots relative to the arm 22 in association with extension and contraction of a bucket cylinder 33. The base end of the bucket cylinder 33 is joined to the arm 22, and the tip thereof is joined to the bucket 23 with the interposition of a link. The boom cylinder 31, the arm cylinder 32, and the bucket cylinder 33 that drive the front work implement 20 are hydraulic actuators.

Further, angle sensors D1 to D3 are disposed at pivot points of the boom 21, the arm 22, and the bucket 23, respectively, and an angle sensor D4 is disposed on the swing device 15 of the swing structure 12. The angle sensor D1 is a sensor that senses a state amount corresponding to action of the boom 21 that is a driven member driven by the boom cylinder 31. In the present embodiment, the angle sensor D1 senses the rotation angle of the boom 21 relative to the swing frame 19 and outputs the rotation angle to a controller 50. The angle sensor D2 is a sensor that senses a state amount corresponding to action of the arm 22 that is a driven member driven by the arm cylinder 32. In the present embodiment, the angle sensor D2 senses the rotation angle of the arm 22 relative to the boom 21 and outputs the rotation angle to the controller 50. The angle sensor D3 is a sensor that senses a state amount corresponding to action of the bucket 23 that is a driven member driven by the bucket cylinder 33. In the present embodiment, the angle sensor D3 senses the rotation angle of the bucket 23 relative to the arm 22 and outputs the rotation angle to the controller 50. The angle sensor D4 is a sensor that senses a state amount corresponding to action of the swing structure 12 that is a driven member driven by the swing motor 34. In the present embodiment, the angle sensor D4 senses the rotation angle of the swing structure 12 relative to the track structure 11 and outputs the rotation angle to the controller 50. In MC control, the posture of the front work implement 20 is computed on the basis of the outputs (sensing signals) of the angle sensors D1 to S5. Moreover, the swing speed of the swing structure 12 is computed on the basis of the output (sensing signal) of the angle sensor D4. The angle sensors D1 to D4 are examples of the sensor that senses action of the driven member (boom 21, arm 22, bucket 23, swing structure 12) driven by the corresponding hydraulic actuator. The amount of time change in each rotation angle sensed by the angle sensor D1 to D4 is an example of the state amount regarding which the change amount corresponds to the action of the corresponding hydraulic actuator.

2. Hydraulic System

FIG. 2 is a hydraulic circuit diagram of the major part of a hydraulic system mounted in the hydraulic excavator of FIG. 1. In FIG. 2, a circuit that drives the boom cylinder 31, the arm cylinder 32, the bucket cylinder 33, and the swing motor 34 is extracted and represented.

The hydraulic system depicted in FIG. 2 includes a plurality of (in the present embodiment, two) hydraulic pumps P1 and P2, a pilot pump P3, directional control valves Vn, solenoid valves Sn1 and Sn2, operation devices Ln, and the controller 50. n is a natural number from 1 to 4 (n=1, 2, 3, 4).

2-1. Hydraulic Pump

The hydraulic pumps P1 and P2 are hydraulic fluid sources for the respective hydraulic actuators mounted in the hydraulic excavator, such as the boom cylinder 31, the arm cylinder 32, the bucket cylinder 33, and the swing motor 34, and are mounted in the machine body 10 (machine room 17) together with a prime mover E. The hydraulic pumps P1 and P2 are driven by the prime mover E and take in a hydraulic operating fluid in a hydraulic operating fluid tank T to raise the pressure thereof and deliver the hydraulic fluid that drives the corresponding hydraulic actuator. Although an engine (internal combustion engine) is depicted as the prime mover E in FIG. 2, an electrically driven motor may be employed as the prime mover E. The hydraulic pumps P1 and P2 are pumps of the variable displacement type in which the capacity is controlled by pump regulators R1 and R2, respectively. Although the hydraulic system including the two hydraulic pumps P1 and P2 is depicted as an example in FIG. 2, three or more hydraulic pumps are included in the hydraulic system in some cases.

The hydraulic fluid delivered from the hydraulic pump P1 flows in a pump line PL1 that is a delivered fluid line of the hydraulic pump P1 and passes through the directional control valves V1 and V3 to be supplied to the boom cylinder 31 and the bucket cylinder 33. A return fluid discharged from the boom cylinder 31 and the bucket cylinder 33 in association with this flows into a tank line TL through the directional control valves V1 and V3 and returns to the hydraulic operating fluid tank T. Although depiction is omitted, the pump line PL1 and the tank line TL are connected through a relief valve that restricts the maximum pressure of the pump line PL1.

Similarly, the hydraulic fluid delivered from the hydraulic pump P2 flows in a pump line PL2 that is a delivered fluid line of the hydraulic pump P2 and passes through the directional control valves V2 and V4 to be supplied to the arm cylinder 32 and the swing motor 34. A return fluid discharged from the arm cylinder 32 and the swing motor 34 in association with this flows into the tank line TL through the directional control valves V2 and V4 and returns to the hydraulic operating fluid tank T. Although depiction is omitted, the pump line PL2 and the tank line TL are connected through a relief valve that restricts the maximum pressure of the pump line PL2.

In the hydraulic system of the present embodiment, the pump lines PL1 and PL2 are independent of each other and a configuration in which flows of the hydraulic fluid flowing in the pump lines PL1 and PL2 are combined to be supplied to the hydraulic actuator is not made. That is, a hydraulic line that bypasses the boom cylinder 31, the arm cylinder 32, the bucket cylinder 33, or the swing motor 34 and directly connects the pump lines PL1 and PL2 is not included. However, although it is desirable that the pump lines PL1 and PL2 be independent of each other, it is also possible to employ a configuration in which the pump lines PL1 and PL2 are connected and flows of the delivered fluid of the hydraulic pumps P1 and P2 can be combined to be supplied to the same hydraulic actuator.

2-2. Pilot Pump

The pilot pump P3 is a pump of the fixed displacement type that outputs a primary pressure (source pressure) of a pilot pressure that drives hydraulically-driven control valves included in the hydraulic system, for example, the directional control valves Vn. This pilot pump P3 is driven by the prime mover E as with the hydraulic pumps P1 and P2. However, a configuration in which the pilot pump P3 is driven by a different power source from the prime mover E may be employed.

2-3. Directional Control Valve

The directional control valves Vn (n=1, 2, 3, 4) control the flow (direction and flow rate) of the hydraulic fluid supplied to the boom cylinder 31, the arm cylinder 32, the bucket cylinder 33, and the swing motor 34.

The directional control valve V1 is for boom driving, and a spool is driven by the pilot pressure input to a pilot hydraulic chamber of the directional control valve V1 and a restoring force of a spring to control feed/discharge of the hydraulic fluid and stop regarding the boom cylinder 31. The directional control valve V1 has ports connected with a bottom-side hydraulic chamber and a rod-side hydraulic chamber of the boom cylinder 31 besides the pump line PL1 of the hydraulic pump P1 and the tank line TL. When the pump line PL1 is connected to the bottom-side hydraulic chamber by the directional control valve V1, the boom cylinder 31 extends and the boom 21 makes boom raising action. Conversely, when the pump line PL1 is connected to the rod-side hydraulic chamber by the directional control valve V1, the boom cylinder 31 contracts and the boom 21 makes boom lowering action. When the pilot pressure does not act on the pilot hydraulic chamber, the spool of the directional control valve V1 is at the neutral position due to the restoring force of the spring, and the connection between the boom cylinder 31 and the pump line PL1 and the tank line TL is interrupted, so that the boom cylinder 31 stops.

Similarly to the directional control valve V1 for the boom cylinder 31, the directional control valve V2 for the arm cylinder 32, the directional control valve V3 for the bucket cylinder 33, and the directional control valve V4 for the swing motor 34 are also driven by the pilot pressure and the restoring force of a spring.

The directional control valve V3 for bucket driving has ports connected with the pump line PL1 of the hydraulic pump P1, the tank line TL, a bottom-side hydraulic chamber and a rod-side hydraulic chamber of the bucket cylinder 33. When the pump line PL1 is connected to the bottom-side hydraulic chamber of the bucket cylinder 33 by the directional control valve V3, the bucket cylinder 33 extends and the bucket 23 makes crowding action. Conversely, when the pump line PL1 is connected to the rod-side hydraulic chamber of the bucket cylinder 33 by the directional control valve V3, the bucket cylinder 33 contracts and the bucket 23 makes dumping action. When the directional control valve V3 returns to the neutral position, the bucket cylinder 33 stops.

The directional control valve V2 for arm driving has ports connected with the pump line PL2 of the hydraulic pump P2, the tank line TL, a bottom-side hydraulic chamber and a rod-side hydraulic chamber of the arm cylinder 32. When the pump line PL2 is connected to the bottom-side hydraulic chamber of the arm cylinder 32 by the directional control valve V2, the arm cylinder 32 extends and the arm 22 makes crowding action. Conversely, when the pump line PL2 is connected to the rod-side hydraulic chamber of the arm cylinder 32 by the directional control valve V2, the arm cylinder 32 contracts and the arm 22 makes dumping action. When the directional control valve V2 returns to the neutral position, the arm cylinder 32 stops.

The directional control valve V4 for swing driving has ports connected with the pump line PL2 of the hydraulic pump P2, the tank line TL, one port and the other port of the swing motor 34. When the pump line PL2 is connected to the one port of the swing motor 34 by the directional control valve V4, the swing motor 34 rotates forward and the swing structure 12 swings toward one side in the left-right direction. Conversely, when the pump line PL2 is connected to the other port of the swing motor 34 by the directional control valve V4, the swing motor 34 rotates reversely and the swing structure 12 swings toward the other side in the left-right direction. When the directional control valve V4 returns to the neutral position, the swing motor 34 stops.

2-5. Solenoid Valve

The solenoid valves Sn1 and Sn2 (n=1, 2, 3, 4) are electromagnetically-driven proportional pressure reducing valves that generate the pilot pressure that drives the directional control valves Vn (n=1, 2, 3, 4). A pilot primary pressure line PL3 that is a delivered fluid line of the pilot pump P3 is connected to the solenoid valves Sn1 and Sn2. The solenoid valves Sn1 and Sn2 are driven by a command signal received from the controller 50 and reduce the pressure of the pilot primary pressure line PL3 to generate the pilot pressure (pilot secondary pressure).

The solenoid valves S11 and S12 generate the pilot pressure that drives the directional control valve V1 for boom driving, and output the pilot pressure to the pilot hydraulic chamber of the directional control valve V1. The solenoid valve S11 is for boom raising operation. When the pilot pressure output by the solenoid valve S11 is input to the directional control valve V1, the delivered fluid of the hydraulic pump P1 is supplied to the bottom-side hydraulic chamber of the boom cylinder 31 and the boom cylinder 31 extends. The solenoid valve S12 is for boom lowering operation. When the pilot pressure output by the solenoid valve S12 is input to the directional control valve V1, the delivered fluid of the hydraulic pump P1 is supplied to the rod-side hydraulic chamber of the boom cylinder 31 and the boom cylinder 31 contracts.

The solenoid valves S21 and S22 generate the pilot pressure that drives the directional control valve V2 for arm driving, and output the pilot pressure to a pilot hydraulic chamber of the directional control valve V2. The solenoid valve S21 is for arm crowding operation. When the pilot pressure output by the solenoid valve S21 is input to the directional control valve V2, the delivered fluid of the hydraulic pump P2 is supplied to the bottom-side hydraulic chamber of the arm cylinder 32 and the arm cylinder 32 extends. The solenoid valve S22 is for arm dumping operation. When the pilot pressure output by the solenoid valve S22 is input to the directional control valve V2, the delivered fluid of the hydraulic pump P2 is supplied to the rod-side hydraulic chamber of the arm cylinder 32 and the arm cylinder 32 contracts.

The solenoid valves S31 and S32 generate the pilot pressure that drives the directional control valve V3 for bucket driving, and output the pilot pressure to a pilot hydraulic chamber of the directional control valve V3. The solenoid valve S31 is for bucket crowding operation. When the pilot pressure output by the solenoid valve S31 is input to the directional control valve V3, the delivered fluid of the hydraulic pump P1 is supplied to the bottom-side hydraulic chamber of the bucket cylinder 33 and the bucket cylinder 33 extends. The solenoid valve S32 is for bucket dumping operation. When the pilot pressure output by the solenoid valve S32 is input to the directional control valve V3, the delivered fluid of the hydraulic pump P1 is supplied to the rod-side hydraulic chamber of the bucket cylinder 33 and the bucket cylinder 33 contracts.

The solenoid valves S41 and S42 generate the pilot pressure that drives the directional control valve V4 for swing driving, and output the pilot pressure to a pilot hydraulic chamber of the directional control valve V4. The solenoid valve S41 is for left swing operation. When the pilot pressure output by the solenoid valve S41 is input to the directional control valve V4, the delivered fluid of the hydraulic pump P2 is supplied to the port on one side in the swing motor 34 and the swing motor 34 rotates forward. The solenoid valve S42 is for right swing operation. When the pilot pressure output by the solenoid valve S42 is input to the directional control valve V4, the delivered fluid of the hydraulic pump P2 is supplied to the port on the other side in the swing motor 34 and the swing motor 34 rotates reversely.

It is to be noted that the pilot pressures output by the solenoid valves Sn1 and Sn2 are each sensed by a pressure sensor Ps to be input to the controller 50.

2-6. Operation Device

The operation devices L1 to L4 are operation lever devices (in the present embodiment, electric lever devices) to operate the directional control valves V1 to V4, respectively, to thereby operate the corresponding hydraulic actuators, and are installed in the room of the cabin 16. The operation device L1 is an operation lever device for boom operation to operate the boom cylinder 31. The operation device L2 is an operation lever device for arm operation to operate the arm cylinder 32. The operation device L3 is an operation lever device for bucket operation to operate the bucket cylinder 33. The operation device L4 is an operation lever device for swing operation to operate the swing motor 34.

The operation devices L1 to L4 share two operation levers. For example, the operation devices L1 and L3 share one operation lever and are disposed on the right side of an operation seat (not depicted). When this operation lever is tilted left or right, the bucket 23 acts. When it is tilted forward or rearward, the boom 21 acts. Further, the operation devices L2 and L4 share one operation lever and are disposed on the left side of the operation seat (not depicted). When this operation lever is tilted left or right, the arm 22 acts. When it is tilted forward or rearward, the swing structure 12 swings. Such a correspondence relationship between the operation direction of the operation lever and the hydraulic actuator can be changed as appropriate. The operation devices L1 to L4 are provided with sensors such as potentiometers that sense the lever operation amount and output it to the controller 50. The respective lever operation amounts of the operation devices L1 to L4 sensed by these sensors are examples of the state amount regarding which the change amount corresponds to the action of the corresponding hydraulic actuator.

3. Controller

The controller 50 is an in-machine computer mounted in the machine body 10 and has a function of controlling hydraulic actuators that drive the front work implement 20, in the present embodiment, the boom cylinder 31 and the arm cylinder 32. The controller 50 includes a computation device 51, a storage device 52, a signal input/output port, and the like. The computation device 51 executes the respective kinds of computation processing of an MC control computation section 53 and an MC control correction section 54, and outputs a control signal to the solenoid valves Sn1 and Sn2 and the pump regulators R1 and R2. The storage device 52 stores, for example, data of a target construction face of a work site that is set by an operator in advance, and the like. The MC control computation section 53 and the MC control correction section 54 are functions executed by the controller 50 (computation device 51), and may be virtually implemented by software or be implemented by hardware such as an electronic circuit. The controller 50 receives, as inputs, the outputs (sensing signals and operation signals) of the angle sensors D1 to D4, the operation devices L1 to L4, and the respective pressure sensors Ps.

In the present embodiment, the MC control computation section 53 controls, for example, the solenoid valves S11, S12, S21, and S22 to execute interlocking control (MC control) of the boom cylinder 31 and the arm cylinder 32 depending on the target face distance that is the distance between a specific point (typically, claw tip of the bucket 23) in the front work implement 20 and a target construction face that is set in advance, the operation signal relating to operation of the operation device L2, and the like. It is to be noted that, although description is omitted, the hydraulic excavator is equipped with a GNSS mobile station that acquires data of the position and the orientation of the machine body 10 and a posture sensor that senses the posture (inclination angle in the front-rear and left-right directions)

of the machine body 10 and, in general, the target face distance is computed in the MC control computation section 53 on the basis of the data of the position, the orientation, the posture, and the like of the machine body 10 relative to the target construction face.

Further, in the present embodiment, the hydraulic pump P1 is the first hydraulic pump, the hydraulic pump P2 is the second hydraulic pump, the boom cylinder 31 is the first hydraulic actuator that is a target of the MC control, and the arm cylinder 32 is the second hydraulic actuator that is a target of the MC control. The swing motor 34 is the third hydraulic actuator that is not a target of the MC control. For example, in the state in which the function of the MC control is enabled, when arm crowding operation is executed in the case in which the target face distance is equal to or shorter than a set value, the controller 50 controls the pump regulators R1 and R2 and the solenoid valves S11, S12, and S21 to cause the boom 21 to act in association with action of the arm 22 such that the claw tip of the bucket 23 moves along the target construction face and scrapes off a ground face. However, even in the middle of the functioning of this MC control, manual interrupt operation of the bucket cylinder 33 or the swing motor 34 is possible.

The MC control correction section 54 corrects the target speed of the hydraulic actuator relating to the MC control in the case in which a hydraulic actuator that is not a target of the MC control is operated in the middle of the functioning of the MC control (that is, manual operation is combined with the MC control) and the hydraulic actuator to which the hydraulic fluid is simultaneously supplied from the same hydraulic pump increases. As a specific example, for example, when swing operation interrupts during the MC control relating to interlocking action of the boom 21 and the arm 22, the supply flow rate of the hydraulic fluid supplied to the swing motor 34 is computed on the basis of the output of the angle sensor D4. Then, the target speed of the arm cylinder 32, which shares the hydraulic fluid source with the swing motor 34, is corrected in the case in which it is determined that the MC control is affected (it becomes impossible to supply a required flow rate for the arm cylinder 32 by the hydraulic pump P2). The correction mentioned here means correcting the target speed of the arm cylinder 32 in the decrease direction from a value according to arm operation such that the target flow rate of the arm cylinder 32 does not exceed the flow rate obtained by subtracting the supply flow rate supplied to the swing motor 34 from the maximum flow rate at which the hydraulic pump P2 can execute delivery.

Next, one specific example of control logic by the MC control computation section 53 and the MC control correction section 54 of the controller 50 is described.

3-1. MC Control

FIG. 3 is a schematic diagram representing logic of MC control by the controller 50 in the first embodiment. FIG. 3 depicts, by way of example, an algorithm of the MC control in which, when the arm 22 is operated by the operation device L2, the boom 21 also acts in association with the arm 22 and the tip of the bucket 23 is moved along a target construction face.

In the example of FIG. 3, the controller 50 repeatedly executes a series of processing such as a swing speed computation 61, a swing flow rate computation 62, a target speed computation 63, a target flow rate computation 64, and a pump flow rate computation 65 at a short cycle (for example, 0.1 s) while the function of the MC control is enabled.

3-2. MC Control Computation Section (Basic Processing)

The controller 50, first, computes a target speed v2 of the arm cylinder 32 (second hydraulic actuator), as basic processing relating to the MC control (corresponding to the content of processing by the MC control computation section 53), on the basis of the operation signal (arm operation amount) of the operation device L2. In addition, the controller 50 computes a target speed v1 of the boom cylinder 31 (first hydraulic actuators) on the basis of the target speed v2 of the arm cylinder 32 and the position, the orientation, the posture, and the target face distance of the machine body 10 (target speed computation 63). Then, the controller 50 computes the respective opening command values of the directional control valves V1 and V2 according to the target speeds v1 and v2 by using, for example, a conversion table, and outputs command signals each depending on the opening command value to the corresponding solenoid valves to control the directional control valves V1 and V2.

Simultaneously, the controller 50 computes a target flow rate Q1 of the hydraulic fluid supplied to the boom cylinder 31 (first hydraulic actuators) on the basis of the target speed v1, and computes a target flow rate Q2 of the hydraulic fluid supplied to the arm cylinder 32 (second hydraulic actuator) on the basis of the target speed v2 (target flow rate computation 64). Then, the controller 50 computes the total flow rate of the target flow rate Q1 relating to boom driving and a target flow rate relating to bucket driving as a target flow rate Qp1 of the hydraulic pump P1, and outputs a pump control command according to the target flow rate Qp1 to control the hydraulic pump P1 (first hydraulic pump) (pump flow rate computation 65). When an interrupt of bucket operation is not made, the target flow rate Qp1 is equivalent to the target flow rate Q1 relating to boom driving. Further, the controller 50 computes the total flow rate of the target flow rate Q2 relating to arm driving and a target flow rate relating to swing driving as a target flow rate Qp2, and outputs a pump control command according to the target flow rate Qp2 to control the hydraulic pump P2 (second hydraulic pump) (pump flow rate computation 65). When an interrupt of swing operation is not made, the target flow rate Qp2 is equivalent to the target flow rate Q2 relating to arm driving.

As a result of the execution of the processing by the MC control computation section 53 in the above-described manner, interlocking control of the boom cylinder 31 (first hydraulic actuators) and the arm cylinder 32 (second hydraulic actuator) is executed.

3-3. MC Control Correction Section (Correction Processing)

Moreover, in the above processing by the MC control computation section 53, correction processing for the target speeds v1 and v2 (processing by the MC control correction section 54) is incorporated, and swing operation or bucket operation combined with the MC control is taken into account for the target speeds v1 and v2. Specifically, when the maximum delivery rate Qmax of the hydraulic pump P1 or P2 is insufficient relative to the total required flow rate for the assigned hydraulic actuators, the target speed v1 or v2 of the hydraulic actuator relating to the MC control is limited.

In the following, regarding the processing by the MC control correction section 54, a description is given by taking as an example the case in which swing operation interrupts during MC control relating to interlocking control of the boom 21 and the arm 22 depending on a target construction face.

In the correction processing relating to the MC control correction section 54, the controller 50 first computes a swing speed v3 of the swing structure 12 on the basis of the output of the angle sensor D4 (sensor) (swing speed computation 61), and computes a supply flow rate Q3 of the hydraulic fluid supplied from the hydraulic pump P2 (second hydraulic pump) to the swing motor 34 (third hydraulic actuator) on the basis of the swing speed v3 (swing flow rate computation 62). If swing operation is executed by the operation device L4 and the swing structure 12 is making swing action in accordance with the swing operation signal, the swing speed v3 and the supply flow rate Q3 with absolute values larger than 0 are computed. When the operation device L4 is not operated and the swing structure 12 is in the stopped state, the computation results of the swing speed v3 and the supply flow rate Q3 are 0.

The supply flow rate Q3 supplied to the swing motor 34 (third hydraulic actuator) computed by the processing of the swing flow rate computation 62 is reflected in the computation of the target speeds v1 and v2 in the target speed computation 63 and the control of the hydraulic pumps P1 and P2 in the pump flow rate computation 65. Specifically, in the target speed computation 63, the supply flow rate Q3 is reflected in the target speed v2 of the arm cylinder 32 and is reflected also in the target speed v1 of the boom cylinder 31 depending on the target speed v2. As a result, when swing operation by the operator is combined during the MC control, the control command values to the solenoid valves and the hydraulic pumps change.

FIG. 4 is a functional block diagram representing details of the processing of the target speed computation 63 in FIG. 3.

The controller 50, first, subtracts the supply flow rate Q3 supplied to the swing motor 34 (swing flow rate) from the maximum flow rate Qmax at which the hydraulic pump P2 (second hydraulic pump) can execute delivery to compute a flow rate difference Qd, in the processing of the target speed computation 63 (processing 63*a*). The flow rate difference Qd is equivalent to the maximum flow rate at which supply can be given to the arm cylinder 32 by only the hydraulic pump P2 without combining a flow of the delivered fluid of the hydraulic pump P1 with a flow of the delivered fluid of the hydraulic pump P2. Next, the controller 50 computes an upper limit speed v2*u* of the arm cylinder 32 (second hydraulic actuator) that can be yielded with the flow rate difference Qd, on the basis of the flow rate difference Qd (processing 63*b*). Simultaneously with the computation of the upper limit speed v2*u*, the controller 50 computes a required speed v2*r* (arm required speed) of the arm cylinder 32 (second hydraulic actuator) according to the operation signal (arm operation amount) of the operation device L2 relating to arm operation (processing 63*c*).

Then, the controller 50 compares the required speed v2*r* of the arm cylinder 32 with the upper limit speed v2*u*, and computes the target speed v2 (arm target speed) of the arm cylinder 32 (second hydraulic actuator) by minimum value selection (processing 63*d*). The target speed v2 is not necessarily the value according to the arm operation amount (arm required speed), and can be corrected depending on swing action (action of the third hydraulic actuator). Specifically, the required speed v2*r* is computed as the target speed v2 when the required speed v2*r* is equal to or lower than the upper limit speed v2*u*, and the upper limit speed v2*u* is computed as the target speed v2 when the required speed v2*r* exceeds the upper limit speed v2*u*. That is, the target speed v2 of the arm cylinder 32 is limited by the upper limit speed v2*u*. In other words, the target speed v2 of the arm cylinder 32 is limited by the flow rate at which supply from the hydraulic pump P2 to the arm cylinder 32 is possible while the supply flow rate Q3 supplied to the swing motor 34 according to swing operation is ensured.

After thus computing the target speed v2, the controller 50 computes the target speed v1 of the boom cylinder 31 (hereinafter, target speed v1) on the basis of the target speed v2 of the arm cylinder 32 and, for example, the machine body posture and the target face distance (processing 63*e*).

As described with FIG. 3, the target speeds v1 and v2 are used for the computation of the command values of the solenoid valves and the target flow rates Q1 and Q2 of the boom cylinder 31 and the arm cylinder 32.

FIG. 5 is a functional block diagram representing details of the processing of the pump flow rate computation 65 in FIG. 3.

The controller 50, first, adds the supply flow rate Q3 (swing flow rate) supplied to the swing motor 34 (third hydraulic actuator) to the target flow rate Q2 (arm crowding target flow rate or arm dumping target flow rate) according to the target speed v2 of the arm cylinder 32 (second hydraulic actuator) to compute the target flow rate Qp2 of the hydraulic pump P2 (second hydraulic pump), in the processing of the pump flow rate computation 65 (processing 65*a*). After computing the target flow rate Qp2, the controller 50 converts the target flow rate Qp2 to a control command value by, for example, a conversion table, and outputs the control command value (second hydraulic pump control command) based on the target flow rate Qp2 to control the hydraulic pump P2 (second hydraulic pump) (processing 65*c*). Further, although not depicted in FIG. 5, the hydraulic pump P1 (first hydraulic pump) is also controlled in accordance with the target flow rate Qp1 in the same manner. Concurrently with this, the controller 50 converts the target speeds v1 and v2 to control command values by, for example, a conversion table, and outputs the control command values based on the target speeds v1 and v2 to control the solenoid valve S11 or S12 and the solenoid valve S21 or S22 (FIG. 3).

It is to be noted that, because the maximum value and the minimum value of the flow rate at which the hydraulic pump P2 can execute delivery are determined depending on the specifications of the hydraulic pump P2 in advance, the maximum value of the target flow rate Qp2 input for the processing 65*c* is limited by the maximum delivery rate Qmax of the hydraulic pump P2 (maximum flow rate of the second hydraulic pump), and the minimum value of the target flow rate Qp2 is limited by a minimum flow rate Qmin of the hydraulic pump P2 (minimum flow rate of the second hydraulic pump) (processing 65*b*).

Through the above processing, in association with manual interrupt operation during the MC control, the MC control is concurrently executed while the control command values for the solenoid valves relating to the MC control and the hydraulic pumps P1 and P2 are corrected and action relating to the manual interrupt operation (in the above-described example, swing) is executed in accordance with operation by the operator. Regarding this MC control, it is determined whether supply at the required flow rate can be given to the second hydraulic actuator relating to the MC control even when the supply flow rate supplied to the third hydraulic actuator relating to the interrupt operation is subtracted. If insufficiency does not occur, the target speed of the second hydraulic actuator is output as required. If insufficiency occurs, the target speed of the second hydraulic actuator is limited and corrected.

Therefore, the target speed of the first hydraulic actuator and the second hydraulic actuator relating to the MC control is not affected when manual operation such as swing operation does not interrupt during the MC control (or when the total required flow rate is equal to or lower than the maximum delivery rate Qmax of the hydraulic pump although interrupt operation is executed). Even when, for example, the target speed of the arm cylinder 32 (second hydraulic actuator) is corrected as the result of interruption of manual operation such as swing operation during the MC control, the trajectory of the bucket 23 does not change and the accuracy of the MC control is not affected because the target speed of the boom cylinder 31 (first hydraulic actuators) is computed depending on the target speed of the arm cylinder 32.

FIG. 6 is a diagram representing an example of transition of the target flow rate Qp2 of the hydraulic pump P2 and the target flow rate Q2 of the arm cylinder 32 included therein in the case in which swing operation interrupts during the MC control in the present embodiment. As depicted in this diagram, in the state in which the swing operation is not combined during the MC control, the supply flow rate Q3 supplied to the swing motor 34 is 0 and the whole of the delivered fluid of the hydraulic pump P2 can be supplied to the arm cylinder 32. Thus, the target flow rate Qp2 of the hydraulic pump P2 is equivalent to the target flow rate Q2 of the arm cylinder 32. However, in the case in which thereafter the swing operation is combined during the MC control and the supply flow rate Q3 supplied to the swing motor 34 is yielded, if the target flow rate Q2 of the arm cylinder 32 and the supply flow rate Q3 are simply added up, there is a possibility that the total flow rate exceeds the maximum delivery rate Qmax of the hydraulic pump P2 and the actual arm speed deviates from the control command value. Moreover, there is a possibility that a speed in accordance with the operation by the operator is not obtained also in the swing action.

In contrast, in the present embodiment, even when the supply flow rate Q3 supplied to the swing motor 34 is yielded and increases, by the above-described correction of the target speed of the arm cylinder 32, the target flow rate Q2 of the arm cylinder 32 is limited by the difference between the maximum delivery rate Qmax of the hydraulic pump P2 and the supply flow rate Q3 supplied to the swing motor 34 so that the total flow rate of the target flow rate Q2 and the supply flow rate Q3 may be kept from exceeding the maximum delivery rate Qmax. Thus, the actual speed of the arm 22 can be aligned with the control command value while swing action in accordance with the operation by the operator is ensured.

Effects

In the present embodiment, in the case in which a hydraulic actuator (for example, swing motor 34) that is not a target of the MC control is combined by manual operation during the MC control, even when the total required flow rate of the manually operated hydraulic actuator and a hydraulic actuator (for example, arm cylinder 32) connected to the same hydraulic line as this hydraulic actuator exceeds the maximum delivery rate of the corresponding hydraulic pump (for example, hydraulic pump P2), the flow rate that can be used in the MC control is limited by the flow rate difference Od obtained by subtracting the required flow rate of the manually operated hydraulic actuator from the maximum delivery rate. Due to this, the target speed of the hydraulic actuator (for example, arm cylinder 32) subjected to the MC control is corrected as appropriate, and the distribution of the flow rate of the hydraulic actuator subjected to the MC control and the flow rate of the manually operated hydraulic actuator can be decided always within the range of the maximum delivery rate Qmax of the hydraulic pump. This avoids, for example, a situation in which flow dividing and flow combining on the hydraulic lines increase due to combining a flow of the delivered fluid of the hydraulic pump P1 with a flow of the delivered fluid of the hydraulic pump P2 and the accuracy of the MC control lowers. Further, it is possible to avoid also the state in which the flow rate is not distributed to the respective hydraulic actuators in accordance with the control command value when the total required flow rate of the respective hydraulic actuators reaches the maximum delivery rate of the hydraulic pump. Regarding manual operation combined during the MC control, supply at the flow rate according to the operation amount is given to the target hydraulic actuator, and thus the target hydraulic actuator is driven in accordance with the manual operation by the operator.

As above, according to the present embodiment, it is possible to suppress the lowering of the accuracy of the MC control while ensuring favorable responsiveness to manual operation intended by the operator even in the case in which a hydraulic actuator that is not a target of the MC control is manually operated during the MC control.

Second Embodiment

FIG. 7 is a schematic diagram representing logic of MC control performed by a controller included in a construction machine according to a second embodiment of the present invention. FIG. 8 is a functional block diagram representing details of processing of a target speed computation in FIG. 7. Elements that are the same as or correspond to the first embodiment in FIGS. 7 and 8 are given the same numerals as the already-described drawings and description thereof is omitted.

A difference of the present embodiment from the first embodiment is that a function of estimating and computing the actual speed of the second hydraulic actuator (for example, arm cylinder 32) on the basis of the output of a sensor (for example, angle sensor D2) that senses action of a driven member (for example, arm 22) driven by the second hydraulic actuator and correcting the target flow rate Q2 of the second hydraulic actuator to cause the computed actual speed to correspond with the target speed of the second hydraulic actuator is added to the controller 50.

In the present embodiment, the controller 50 computes an estimated value of a driving speed relating to actual extension or contraction of the arm cylinder 32 (estimated arm actual speed) on the basis of the change amount per time regarding the sensing signal (arm angle) input from the angle sensor D2 (processing 63*f*). As depicted in FIG. 8, the target speed v2 (arm target speed) of the arm cylinder 32 computed in the processing 63*d* is corrected by feedback control based on the estimated arm actual speed, and a post-correction target speed v2' is output (processing 63*g*). Then, a target flow rate G2 is computed on the basis of the post-correction target speed v2' in the processing of the target flow rate computation 64 (FIG. 7). Although FIG. 8 depicts the example in which the target speed v1 of the boom cylinder 31 is computed on the basis of the target speed v2 similarly to the first embodiment, it is also possible to employ a configuration in which the target speed v1 is computed on the basis of the post-correction target speed v2.

The present embodiment is similar to the first embodiment regarding the other points.

According to the above-described configuration, in addition to effects similar to those of the first embodiment, the difference between the target speed v2 of the second hydraulic actuator (in the present example, arm cylinder 32) and the actual speed can be made small by the feedback control. Thus, the accuracy of the MC control can be further improved.

Third Embodiment

FIG. 9 is a functional block diagram representing details of processing of a target speed computation performed by a controller included in a construction machine according to a third embodiment of the present invention, and is a diagram corresponding to FIGS. 4 and 8. Elements that are the same as or correspond to the first embodiment or the second embodiment in FIG. 9 are given the same numerals as the already-described drawings and description thereof is omitted.

A difference of the present embodiment from the first embodiment and the second embodiment is that a function of limiting increase in the target speed v2 of the second hydraulic actuator (for example, arm cylinder 32) in association with decrease in the supply flow rate Q3 of the hydraulic fluid supplied from the second pump (for example, hydraulic pump P2) to the third hydraulic actuator (for example, swing motor 34) is added to the controller 50.

In the present embodiment, the post-correction target speed v2' computed in the processing 63*g* is output through a low-pass filter (processing 63*h*), and is sent to the processing of the target flow rate computation 64 (FIG. 7) as a target speed v2" regarding which increase is limited through smoothing of the signal waveform. Although the example in which the low-pass filter is used for the processing 63*h* is depicted in FIG. 9, it is also possible to use a rate limiter that limits the increase rate. Further, although the form in which the processing 63*h* is applied to the second embodiment is exemplified in the example of FIG. 9, it is also possible to employ a form in which the processing 63*h* is applied to the first embodiment (that is, form in which the processing 63*f* and the processing 63*g* are omitted). Although FIG. 9 depicts the example in which the target speed v1 of the boom cylinder 31 is computed on the basis of the target speed v2 similarly to the first embodiment and the second embodiment, it is also possible to employ a configuration in which the target speed v1 is computed on the basis of the post-correction target speed v2' or v2".

The present embodiment is similar to the first embodiment regarding the other points.

According to the above-described configuration, in addition to effects similar to those of the first embodiment or the second embodiment, it is possible to suppress rapid change in the target speed v2 and hence the actual speed of the hydraulic actuator relating to the MC control (for example, arm cylinder 32) attributed to rapid increase in the flow rate at which supply to the hydraulic actuator relating to the MC control is possible due to decrease in the supply flow rate Q3 supplied to the hydraulic actuator relating to manual operation (third hydraulic actuator) in the case in which the manual operation is canceled or the operation amount has decreased from the state in which the manual operation is combined during the MC control.

Due to this, according to the present embodiment, even when, for example, the difference between the target speed v2' of the arm cylinder 32 computed in the processing 63*g* and the estimated actual speed of the arm cylinder 32 has rapidly become large in a short time, rapid speed change of the arm 22 can be prevented and a sense of discomfort of the operator attributed to shock to the machine body due to the rapid speed change can be suppressed. In addition, the present embodiment achieves also an effect of suppression of the lowering of the accuracy of the MC control due to the fact that speed change of the boom 21, which is heavier and is more susceptible to the inertia than the arm 22, does not follow rapid speed change of the arm 22.

As a specific situation in which the difference between the target speed v2' of the arm cylinder 32 and the estimated actual speed rapidly becomes large in a short time, the case in which swing operation that has interrupted during the MC control is canceled is given as an example. When the operator has stopped the swing operation, the upper limit speed v2*u* recovers to a value permitted with the maximum delivery rate Qmax of the hydraulic pump P2. Thus, the target speed v2 of the arm cylinder 32 rises. On the other hand, at the moment of the recovery of the upper limit speed v2*u*, the estimated actual speed of the arm cylinder 32 remains at the speed yielded during the combining with the swing action due to response delay. Thus, the difference between the target speed v2' of the arm cylinder 32 and the estimated actual speed rapidly increases instantaneously. As depicted in FIG. 10, such a situation possibly occurs in, for example, the case in which swing operation becomes no operation (0) from the maximum operation amount, or the case in which swing operation becomes fine operation from the maximum operation amount (case in which the operation amount decreases), or the case in which swing operation becomes no operation (0) from an intermediate operation amount smaller than the maximum operation amount.

Modifications

In the above-described respective embodiments, in the relation with the description of the scope of claims, the hydraulic pump P1 corresponds to the first hydraulic pump, the hydraulic pump P2 corresponds to the second hydraulic pump, the boom cylinder 31 corresponds to the first hydraulic actuator, the arm cylinder 32 corresponds to the second hydraulic actuator, and the swing motor 34 corresponds to the third hydraulic actuator. However, the present invention is not limited to this example. For example, as an example of the hydraulic actuator corresponding to the third actuator, a hydraulic actuator mounted for the attachment, such as the bucket cylinder 33, a positioning cylinder, or a tilt rotator, is also applicable besides the swing motor 34.

For example, in MC control in which action of the arm 22 and the boom 21 is controlled by arm operation, not only swing operation but also bucket operation is combined in some cases. In this case, the hydraulic actuator that shares the hydraulic fluid source with the bucket cylinder 33 is the boom cylinder 31. Thus, in the relation with the description of the scope of claims, the hydraulic pump P2 corresponds to the first hydraulic pump, the hydraulic pump P1 corresponds to the second hydraulic pump, the arm cylinder 32 corresponds to the first hydraulic actuator, the boom cylinder 31 corresponds to the second hydraulic actuator, and the bucket cylinder 33 corresponds to the third hydraulic actuator. In this case, the supply flow rate Q3 of the hydraulic fluid supplied from the hydraulic pump P1 (second hydraulic pump) to the bucket cylinder 33 (third hydraulic actuator) is computed on the basis of the output of the angle sensor D3 (sensor). Further, on the basis of the flow rate difference Qd between the maximum delivery rate of the hydraulic pump P1 (second hydraulic pump) and the supply flow rate Q3 supplied to the bucket cylinder 33 (third hydraulic actuator), an upper limit speed v1*u* of the boom cylinder 31 (second hydraulic actuator) that can be output with the flow rate difference Qd is computed. The upper limit speed v1*u* is compared with the required speed of the boom cylinder 31 (second hydraulic actuator) according to the operation signal of the operation device L2 relating to operation of the front work implement 20 (arm operation). When the required speed is equal to or lower than the upper limit speed v1*u*, the required speed is computed as the target speed v1 of the boom cylinder 31 (second hydraulic actuator). When the required speed exceeds the upper limit speed v1*u*, the upper limit speed v1*u* is computed as the target speed v1. When the target speed v1 of the boom cylinder 31 is limited in this manner, it is also possible to execute back calculation of the target speed v2 of the arm cylinder 32 from the target speed v1 of the boom cylinder 31.

Moreover, although the case in which the supply flow rate Q3 supplied to the third hydraulic actuator (for example, swing motor 34) is computed on the basis of the output of the angle sensor (for example, angle sensor D4) has been exemplified, it is also possible to employ a configuration in which the supply flow rate Q3 is computed on the basis of, for example, the operation amount of the corresponding operation device (for example, operation device L4).

In the above-described respective embodiments, the example in which electric lever devices are employed for the operation devices L1 to L4 has been described. However, it is also possible to employ the pilot operated type in which a pilot valve is mechanically operated by an operation lever, for the operation devices L1 to L4. When the pilot operated type is employed for the operation devices L1 to L4, a pilot pressure is generated by the pilot valve (pressure reducing valve) mechanically interlocked with the operation lever with use of the pressure of the pilot primary pressure line PL3 as the source pressure, and the directional control valve V1 to V4 is driven by the pilot pressure. In this case, the solenoid valves Sn1 and Sn2 for MC control are disposed, for example, between the pilot valve and the corresponding directional control valve, or between the pilot pump P3 and the directional control valve, with the pilot valve bypassed. It is possible to employ a configuration in which the pilot pressure output by the pilot valve is sensed by a pressure sensor as the lever operation amount. Alternatively, it is also possible to employ a configuration in which the lever operation amount itself is sensed by a potentiometer or the like.

Further, in the second embodiment or the third embodiment, the example in which an actual value of the swing speed is estimated on the basis of the output of the angle sensor D4 has been described. However, it is also possible to use an angular velocity meter that directly senses the angular velocity of swing. Moreover, it is also conceivable that the swing speed is estimated from the swing operation amount. In addition, in preparation for failure of the sensor, a configuration in which these multiple systems are combined may be employed.

Besides, although the example in which the posture of the front work implement 20 is computed on the basis of the outputs of the angle sensors D1 to D3 has been described, it is also possible to use, for example, a stroke sensor (any system such as a wire type or a wheel type is available) that senses the stroke of a hydraulic cylinder. It is also possible to employ a configuration in which the posture of the front work implement 20 is computed on the basis of the output of an acceleration sensor such as an IMU that senses the angle of a driven member such as the boom 21 on the basis of the direction of gravity. Moreover, in preparation for failure of the sensor, a configuration in which these multiple types are combined may be employed.

DESCRIPTION OF REFERENCE CHARACTERS

10: Machine body
12: Swing structure (driven member)
20: Front work implement
31: Boom cylinder (first hydraulic actuator)
32: Arm cylinder (second hydraulic actuator)
34: Swing motor (third hydraulic actuator)
50: Controller
Dn: Angle sensor (sensor)
Ln: Operation device
P1: Hydraulic pump (first hydraulic pump)
P2: Hydraulic pump (second hydraulic pump)
Vn: Directional control valve
Sn1, Sn2: Solenoid valve

The invention claimed is:

1. A construction machine comprising:
a machine body;
a front work implement attached to the machine body;
a first hydraulic pump and a second hydraulic pump mounted in the machine body;
a first hydraulic actuator that is driven by a delivered fluid of the first hydraulic pump and drives the front work implement;
a second hydraulic actuator that is driven by a delivered fluid of the second hydraulic pump and drives the front work implement;
a third hydraulic actuator driven by the delivered fluid of the second hydraulic pump;
a directional control valve that controls a flow of a hydraulic fluid supplied from the second hydraulic pump to the second hydraulic actuator;
solenoid valves that generate a pilot pressure that drives the directional control valve;
an operation device for operating the front work implement;
a sensor that senses a state amount corresponding to action of the third hydraulic actuator; and
a controller that controls the solenoid valves, the first hydraulic pump, and the second hydraulic pump on a basis of a target face distance that is a distance between a specific point in the front work implement and a target construction face that is set in advance and an operation signal according to operation of the operation device, wherein
the controller is configured to
compute a supply flow rate of the hydraulic fluid supplied from the second hydraulic pump to the third hydraulic actuator, on a basis of an output of the sensor,
compute an upper limit speed of the second hydraulic actuator on a basis of a flow rate difference between a maximum flow rate at which the second hydraulic pump is capable of delivering and the supply flow rate supplied to the third hydraulic actuator,
compare a required speed of the second hydraulic actuator according to the operation signal with the upper limit speed, compute the required speed as a target speed of the second hydraulic actuator when the required speed is equal to or lower than the upper limit speed, and compute the upper limit speed as the target speed when the required speed exceeds the upper limit speed, add the supply flow rate supplied to the third hydraulic actuator to a flow rate according to the target speed of the second hydraulic actuator to compute a target flow rate of the second hydraulic pump, and control the solenoid valves on a basis of the target speed and control the second hydraulic pump on a basis of the target flow rate.

2. The construction machine according to claim 1, wherein the state amount corresponding to action of the third hydraulic actuator is an amount of angle change of a driven member driven by the third hydraulic actuator or an operation amount of the third hydraulic actuator.

3. The construction machine according to claim 1, wherein the construction machine includes a second sensor that senses action of a driven member driven by the second hydraulic actuator, and the controller is configured to compute an actual speed of the second hydraulic actuator on a basis of an output of the second sensor, and correct the target flow rate so as to cause the actual speed to correspond with the target speed.

4. The construction machine according to claim 1, wherein the controller is configured to limit, to a predetermined value, increase in the target speed in association with decrease in the supply flow rate of the hydraulic fluid supplied from the second hydraulic pump to the third hydraulic actuator.

* * * * *